United States Patent [19]

Suzuki et al.

[11] Patent Number: 5,164,860
[45] Date of Patent: Nov. 17, 1992

[54] ELECTRICALLY DRIVEN ZOOM LENS BARREL

[75] Inventors: Hiroaki Suzuki; Shinsuke Kohmoto, both of Tokyo, Japan

[73] Assignee: Asahi Kogaku Kogyo Kabushiki Kaisha, Tokyo, Japan

[21] Appl. No.: 655,340

[22] Filed: Feb. 14, 1991

[30] Foreign Application Priority Data

Feb. 14, 1990 [JP] Japan ................................ 2-33017

[51] Int. Cl.⁵ ............................................ G02B 15/00
[52] U.S. Cl. .................................. 359/696; 359/697; 359/823; 354/400; 354/486
[58] Field of Search ............... 359/694, 695, 696, 697, 359/698, 699, 700, 823, 830; 354/195.12, 400, 402, 403, 404, 486

[56] References Cited

U.S. PATENT DOCUMENTS 3,834,796  9/1974  Komine ............................. 359/697
4,890,132  12/1989 Hama ................................ 359/400
4,936,664  6/1990  Haraguchi et al. ................ 359/696

FOREIGN PATENT DOCUMENTS 1524497  9/1978  United Kingdom .

Primary Examiner—Loha Ben
Attorney, Agent, or Firm—Sandler, Greenblum & Bernstein

[57] ABSTRACT

An electrically driven zoom lens barrel is provided with an indicating plate for indicating whether a zooming operation is being carried out in an electric mode or a manual mode. The indicating plate is provided separately from a zooming operation ring, which is moved forward to rearward to switch a zooming operation between the electric mode and the manual mode. The indicating plate displays the manual mode when the zooming operation is carried out in the manual mode, and displays the electric mode and a zooming direction when the zooming operation is carried out in the electric mode.

18 Claims, 9 Drawing Sheets

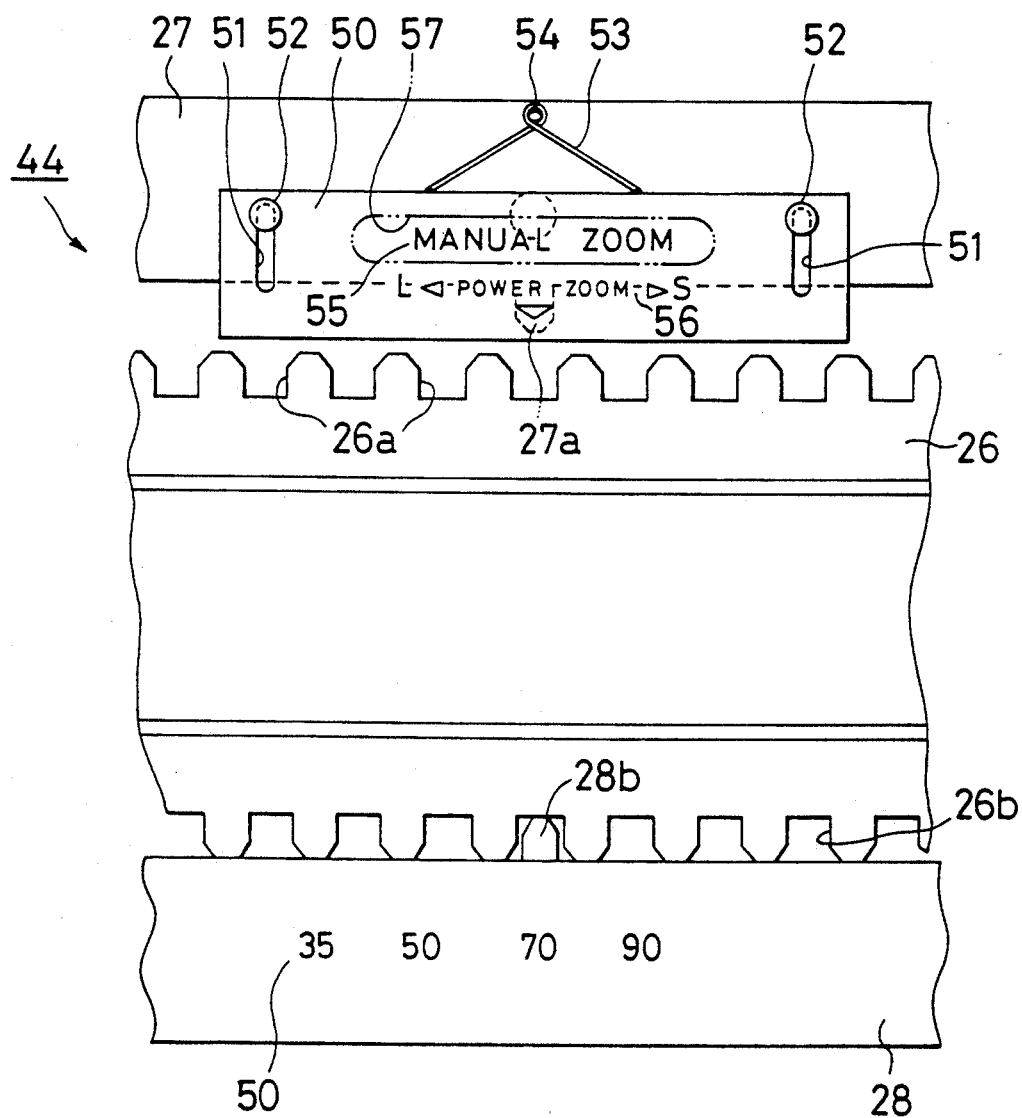

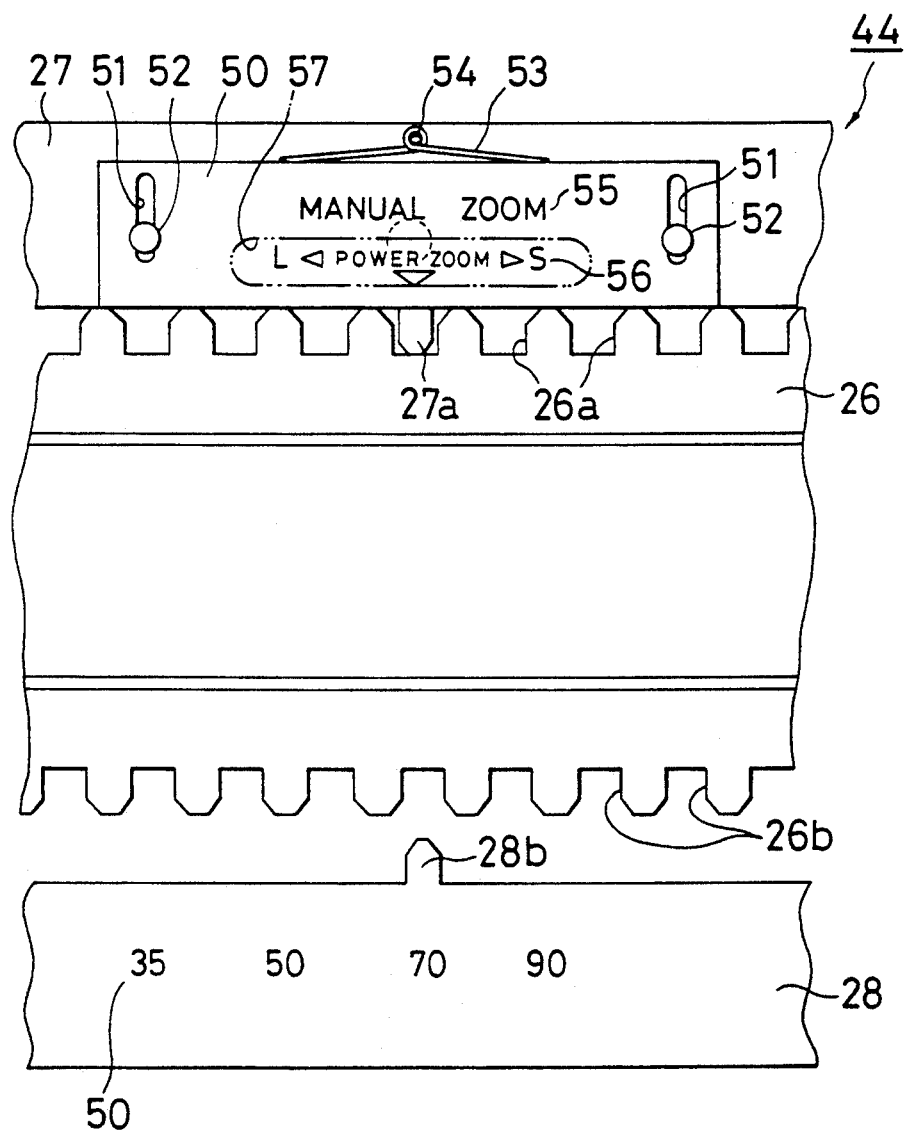

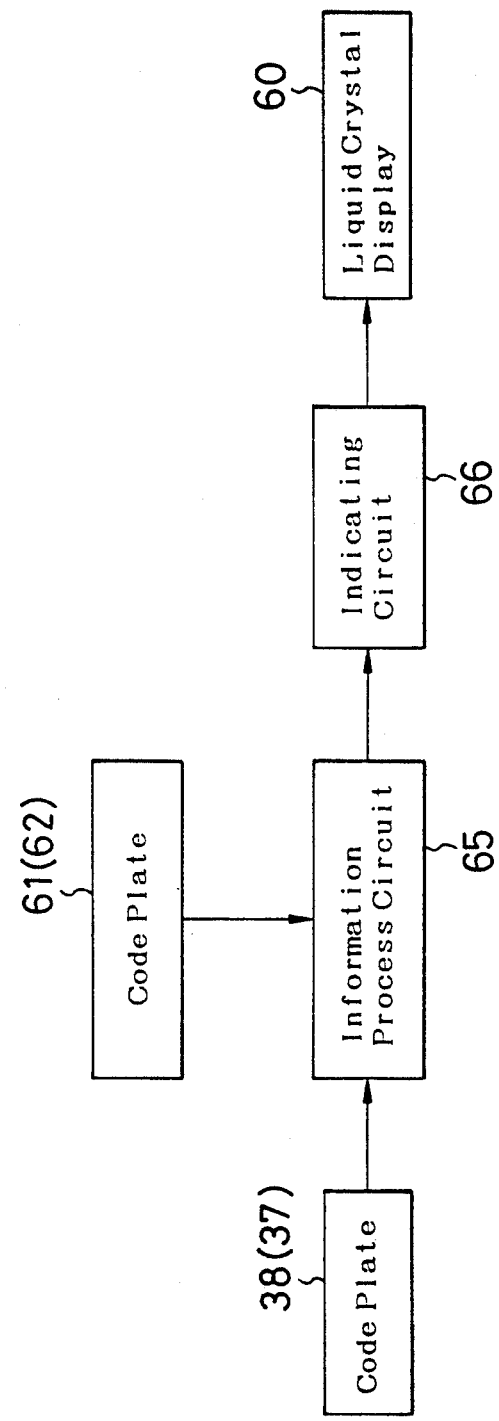

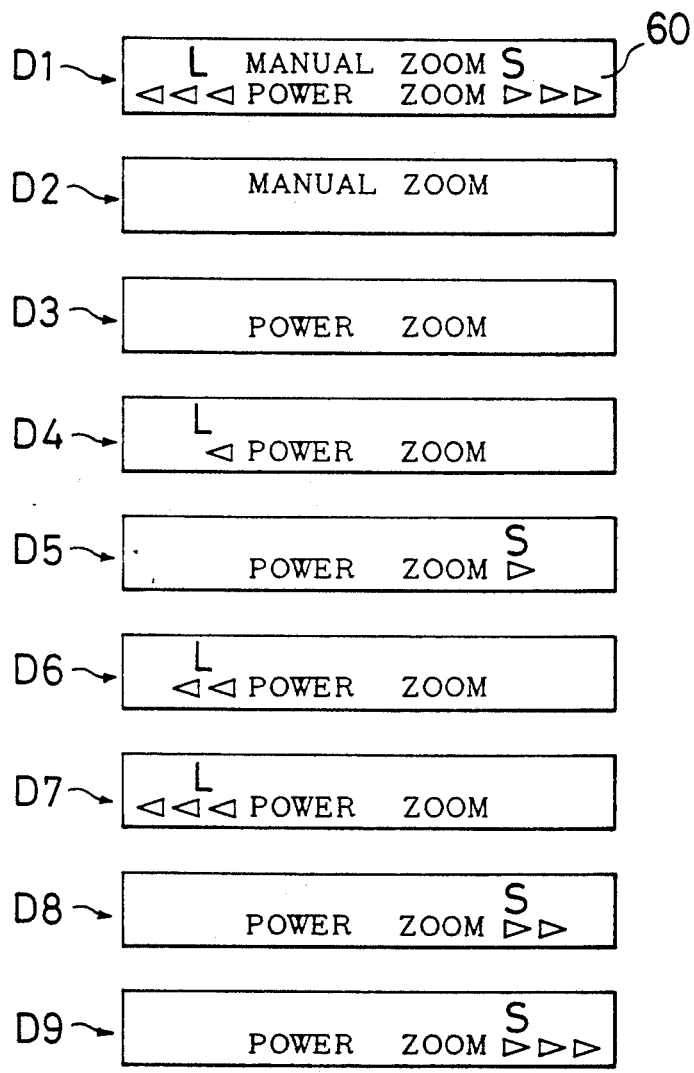

ELECTRICALLY DRIVEN ZOOM LENS BARREL

BACKGROUND OF THE INVENTION

1. Field of the Invention

The present invention relates to an electrically driven zoom lens barrel by which a zooming operation can be switched between a manual mode and an electric mode, in which the zooming operation is electrically powered, and more particularly, relates to an indicating device for the electrically driven zoom lens barrel.

2. Description of the Related Art

In this kind of electrically driven zoom lens barrel, conventionally, an indication of a manual mode and an electric mode, and an indication of an operating condition in the electric mode, are displayed by an operating member used for a zooming operation. The position at which this operating member can be mounted, however, is restricted, due to a mechanism thereof, and therefore, sometimes this operating member must be located at a position at which the display, by the operating member, cannot be easily and clearly seen. Further, in a conventional device, since a switching member for switching between the electric mode and the manual mode, and a zooming member for an electrical operation and a manual operation, are provided, separately, it is difficult to see both of these members at the same time, and thus a mistake in the operation might be made.

SUMMARY OF THE INVENTION

Therefore, an object of the present invention is to provide an electrically driven zoom lens barrel in which a distinction between the electric mode and the manual mode, and a zooming direction in the electric mode, are indicated together at a position at which they can be easily seen.

According to the present invention, there is provided an electrically driven zoom lens barrel comprising a moving mechanism, an electric operating mechanism, a manual operating mechanism, a control mechanism, and an indicating member. The moving mechanism moves the lens groups provided in the zoom lens barrel, to thereby carry out a zooming operation. The moving mechanism is electrically operated by the electric operating mechanism and is manually operated by the manual operating mechanism. The control mechanism selectively actuates one of the electric operating mechanism and the manual operating mechanism. The indicating member indicates whether zooming is carried out by the electric operating mechanism or the manual operating mechanism, and is provided separately from the control mechanism.

Further, according to the present invention, there is provided an electrically driven zoom lens barrel comprising a switching member, a zooming operation member, and an indicating member. The switching member is provided for switching between the electric mode and the manual mode, the zooming operation member is provided for carrying out a zooming by the electric mode or the manual mode, and the indicating member is provided separately from the switching member and the zooming operation member. The indicating member indicates the manual mode when the switching member is switched to the manual mode, and indicates the electric mode and the zooming direction when the switching member is switched to the electric mode.

Still further, according to the present invention, there is provided an electrically driven zoom lens barrel characterized in that an indicating member is provided separately from the mechanisms for carrying out the zooming operation and the switching between the electric mode and the manual mode. The indicating member indicates the manual mode when the zooming operation is carried out in the manual mode, and the electric mode and the zooming direction, when the zooming operation is carried out in the electric mode.

BRIEF DESCRIPTION OF THE DRAWINGS

The present invention will be better understood from the description of the preferred embodiments of the invention set forth below, together with the accompanying drawings, in which:

FIG. 5A is an extended plane view showing a main part of a switch ring in a manual zooming position;

FIG. 5B is an extended plane view showing the main part of the switch ring in a power zooming position;

FIG. 8 is a block diagram of the second embodiment; and

FIG. 9 is a plane view showing examples of indications made by a liquid crystal display.

DESCRIPTION OF THE PREFERRED EMBODIMENTS

Figure 1:
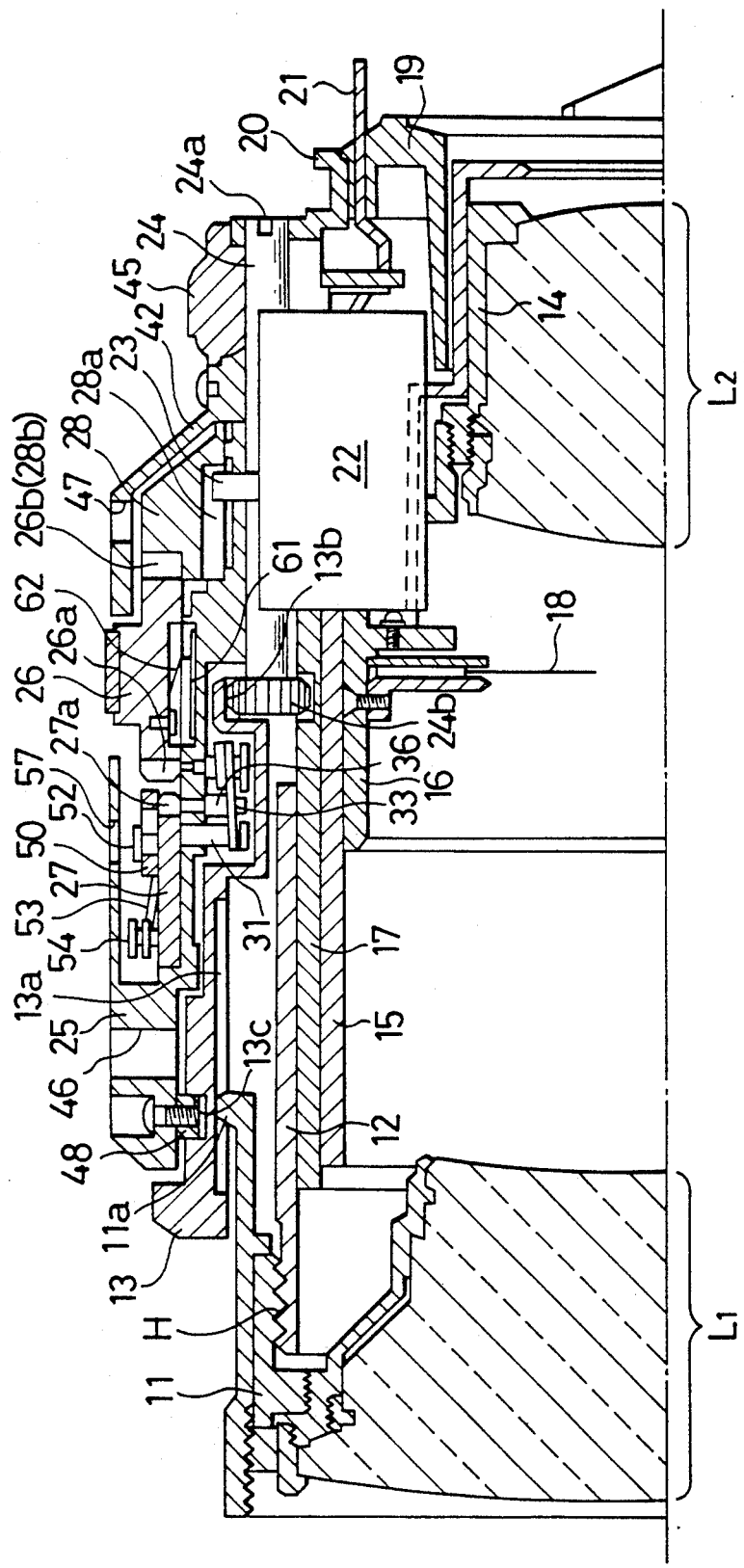
FIG. 1 is a sectional view of an electrically driven zoom lens barrel of a first embodiment of the present invention, in which the zoom lens is in a wide-angle state.

The present invention will now be described with reference to the embodiments shown in the drawings. In this embodiment, the present invention is applied to a two-lens group type electrically driven zoom lens.

FIG. 1 shows a first embodiment of the present invention, in which the zoom lens is in a wide-angle state. Namely, a front lens group L1 is fixed to a front frame 11, which is threadingly fitted to a helicoid ring 12 through a helicoid H. The front frame 11 is provided with a straight guide projection 11a which is engaged with a straight guide groove 13a formed on a focus ring 13 and extending along the optical axis.

A rear lens group L2 is fixed to the rear frame 14. A pin (not shown) provided on the rear frame 14 is engaged with a cam groove (not shown) formed on a cam ring 15, and similarly, a pin (not shown) provided on a stop moving ring 16 is engaged with a cam groove (not shown) formed on the cam ring 15. The cam ring 15 is rotatably supported on an inner surface of a stationary cylinder 17, and the rear frame 14 is fitted to an inner surface of the stationary cylinder 17. The rear frame 14 and the stop moving ring 16 are supported by a straight drive guide mechanism (not shown), provided between the stationary ring 17 and the rear frame 14 and the stop moving ring 16, and thus are moved only linearly along the optical axis relative to the stationary cylinder 17. Therefore, when the cam ring 15 is rotated about the optical axis, the rear frame 14 and the stop moving ring 16 are moved linearly along the optical axis, in accordance with a relationship determined by the cam grooves formed in the cam ring 15. The stop moving ring 16 is provided with stop blades 18 and a light interruption ring 19. The stop blades 18 are opened and closed by a stop lever 21 projecting backward from a mount ring 20.

The helicoid ring 12 is provided with a cam groove (not shown) in which a pin (not shown), fixed to the cam ring 15, is inserted. Accordingly, when the cam ring 15 is rotated about the optical axis, the front frame 11, which is guided by the straight guide groove 13a, is moved linearly along the optical axis through the helicoid ring 12. Namely, when the cam ring 15 is rotated, the front lens group L1 and the rear lens group L2 are moved along the optical axis while the distance therebetween is changed in accordance with a predetermined relationship, whereby a zooming operation is carried out.

The cam ring 15 is rotated together with the stationary (in the axial direction) cylinder 17, by a motor 22 fixed to an inner surface of the zoom lens barrel, but the cam ring 15 also can be rotated by a manual lever 23 projecting radially therefrom.

The focus ring 13 is rotated by an autofocus shaft 24 having a rear end joint portion 24a which coincides with a surface of the mount ring 20 and is connected to a drive shaft (not shown) provided in the camera body, whereby the autofocus shaft 24 is rotated by the drive shaft about the axis of the shaft 24. A gear 24b formed on a front end of the autofocus shaft 24, is engaged with a gear 13b formed on an inner surface of the focus ring 13. Therefore, when the autofocus shaft 24 is rotated, the focus ring 13 is also rotated, whereby the front frame 11 is rotated together with the focus ring 13 by an engagement of the straight guide groove 13a and the straight guide projection 11a. When the front frame 11 is rotated, the front lens group L1 is moved along the optical axis through the helicoid H, whereby a focusing operation is carried out.

A stationary cylinder 25 is located outside the focus ring 13. A zooming operation ring 26, a switch ring 27 and a manual zooming ring 28 are rotatably provided outside the stationary cylinder 25, respectively.

Figure 2:
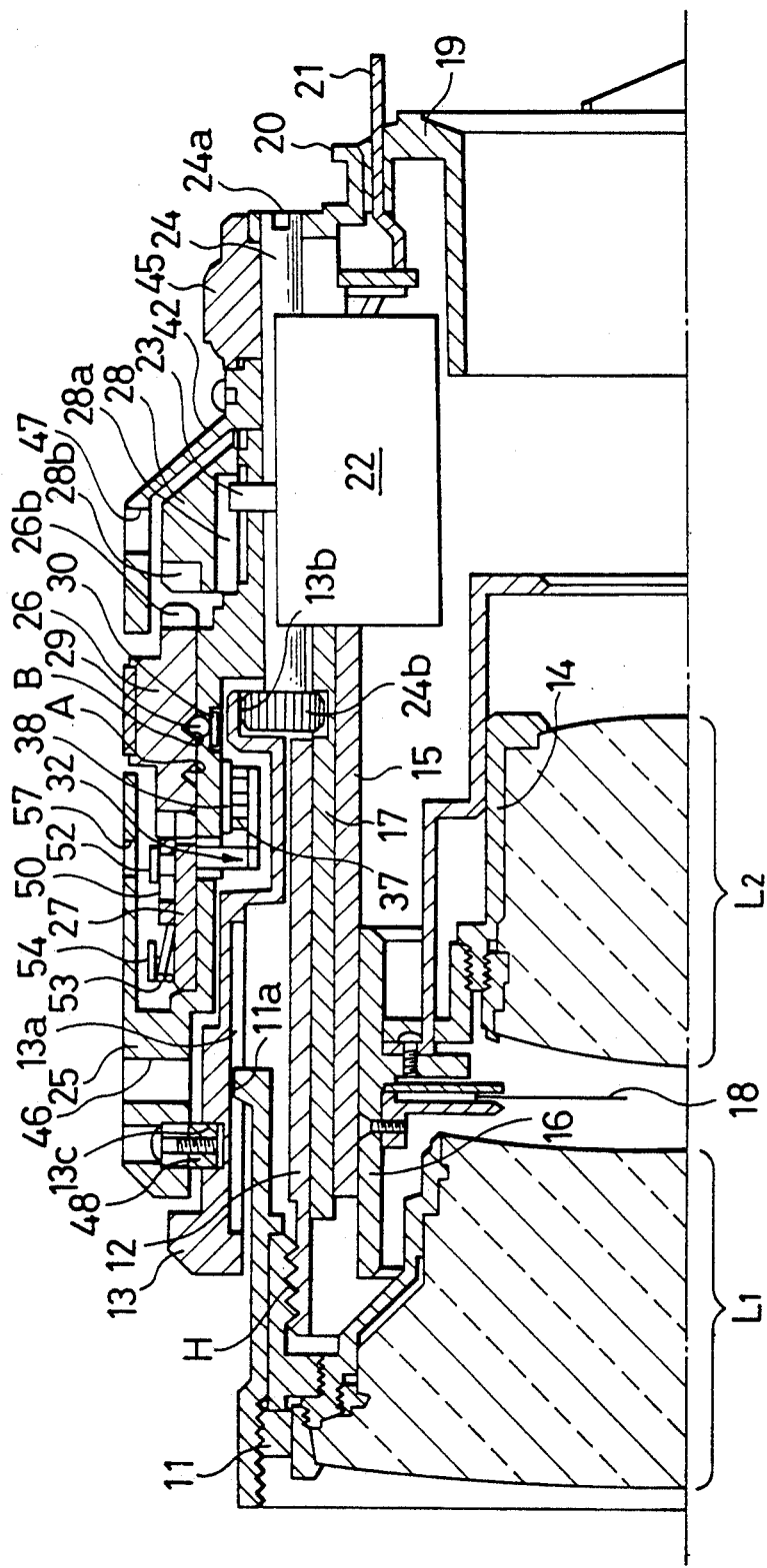
FIG. 2 is a sectional view of the first embodiment, in which the zoom lens is in a telephoto state.

As shown in FIG. 2, the zooming operation ring 26 is provided, on an inner surface thereof, with two V-grooves A and B extending in an circumferential direction, and the stationary cylinder 25 is provided with a click ball 29 engageable with the V-grooves A and B, and urged outward by a flat spring 30. The zooming operation ring 26 can be moved along the optical axis between the two positions at which the click ball 29 is engaged with the V-groove A or B, and is firmly held at these positions.

The switch ring 27 is provided with a return pin 31 (FIG. 1) and a brush pin 32 (FIG. 2) which project inwardly through holes formed in the stationary cylinder 25.

Figure 3A:
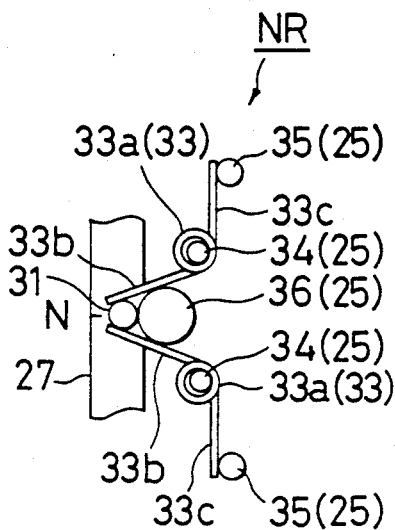
FIG. 3A is a plane view showing a main part of a neutral position return mechanism when the switch ring is in a neutral position.
Figure 3B:
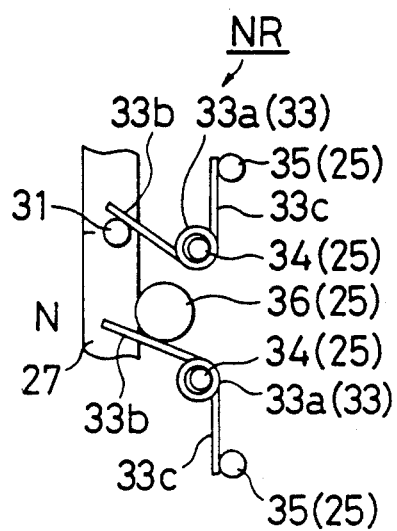
FIG. 3B is a plane view showing a main part of the neutral position return mechanism when the switch ring is in a zooming position.

The return pin 31 is a component of a neutral position return mechanism NR as shown in FIGS. 3A and 3B, and is engaged with a pair of return springs 33 fixed to the stationary cylinder 25 in such a manner that the spring forces of these springs 33 are imposed on opposite sides of the return pin 31, so that when the switch ring 27 is not subjected to an external force, the return pin 31 and the switch ring 27 are returned to the neutral position N. The return springs 33 are provided at symmetric positions about the return pin 31, and center coil portions 33a of the return springs 33 are fitted to pins 34, respectively, and leg portions 33b and 33c of the return springs 33 are engaged with the return pin 31 and a pin 35, respectively. The leg portions 33b are also engaged with a neutral pin 36 facing the return pin 31. The pin 34, the pin 35, and the neutral pin 36 are fixed to the stationary cylinder 25.

Figure 4:
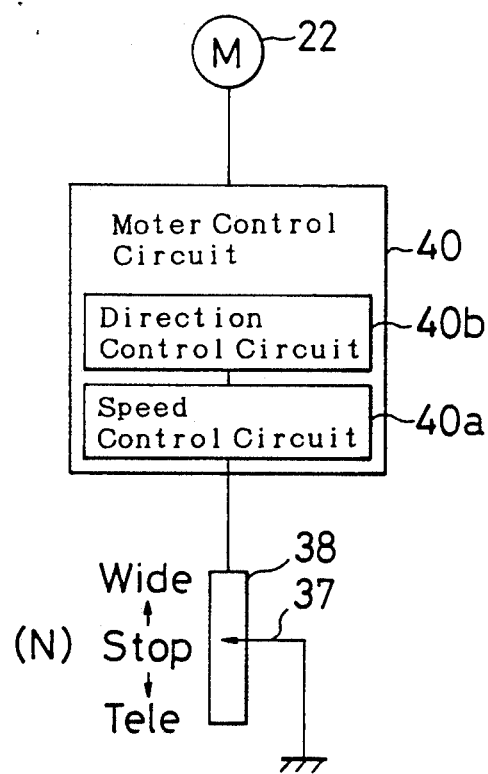
FIG. 4 is a block diagram showing a control circuit of a motor.

As shown in FIG. 2, the brush pin 32 has a brush 37 fixed to an end thereof, and the brush 37 is in contact with a code plate 38 provided on an inner surface of the stationary cylinder 25. The brush 37 and the code plate 38 are provided for sensing a direction and an amount of rotation of the switch ring 27 from the neutral position N. signals output from the brush 37 and the code plate 38 are inputted to a motor control circuit 40 connected to the motor 22, as shown in FIG. 4. The motor control circuit 40 receives the signals denoting the direction and amount of rotation of the switch ring 27, and controls the direction and speed of rotation of the motor 22 through a rotation direction control circuit 40a and a speed control circuit 40b provided in the motor control circuit 40.

The manual zoom ring 28 is provided between the stationary cylinder 25 and a cover ring 42 provided at the rear end of the stationary cylinder 25. A front end of the manual zoom ring 28 is in contact with a step portion formed on an end surface of the stationary cylinder 25, and a rear end of the manual zoom ring 28 is in contact with the cover ring 42. Thus, the movement of the manual zoom ring 28 along the optical axis is restricted. The manual zoom ring 28 also is provided with a straight groove 28a on an inner surface thereof, with which the manual lever 23 is engaged. The straight groove 28a is provided only to facilitate the assembling of the zoom lens, and does not allow the manual lever 23 and the manual zoom ring 28 to move along the optical axis.

As shown in FIGS. 5A and 5B, a selective engagement mechanism 44 (or a clutch mechanism) is provided for the zooming operation ring 26, the switch ring 27, and the manual zooming ring 28. This selective engagement mechanism 44 is constructed by providing the zooming operation ring 26 with notches 26a on an end portion thereof and close to the switch ring 27, which is provided with a projection 27a engageable with and disengageable from the notches 26a, and providing the zooming operation ring 26 with notches 26b on an end portion thereof and close to the manual zooming ring 28, which is provided with a projection 28b engageable with and disengageable from the notches 26b. The notches 26a and notches 26b are equidistantly formed along the periphery of the end portion of the zooming operation ring 26, respectively.

The projection 27a and one of the notches 26a, and the projection 28b and one of the notches 26b, are not engaged with each other at the same time. Namely, when the zooming operation ring 26 is moved forward so that the click ball 29 is engaged with the V-groove B, the projection 27a and one of the constant interval notches 26a are engaged with each other as shown in FIGS. 2 and 5B. Conversely, when the zooming operation ring 26 is moved backward so that the click ball 29 is engaged with the V-groove A, the projection 28b and one of the constant interval notches 26b are engaged with each other as shown in FIGS. 1 and 5A.

An indicating plate 50 is slidably provided on the switch ring 27 and close to the zooming operation ring 26. As shown in FIGS. 5A and 5B, the indicating plate 50 is provided with a plurality of guide grooves 51 extending in parallel to the optical axis, and guide pins 52 fixed to the switch ring 27 are engaged in the grooves 51 respectively. Thus the indicating plate 50 is movable on the switch ring 27 and along the guide grooves 51 and within an effective length thereof. A spring 53 is supported on the switch ring 27 by a pin 54 and urges the indicating plate 50 backward, i.e., toward the zooming operation ring 26. A manual mode indication 55 and an electric mode indication 56 are engraved on the indicating plate 50 in such a manner that the positions thereof, in the forward and backward directions, are different. The electric mode indication 56 includes a mark "L" (a long focal length), a mark "S" (a short focal length), and arrows indicating the zooming directions.

The manual mode indication 55 and the electric mode indication 56 are exposed through a mode indicating window 57 formed in the stationary cylinder 25. Namely, the manual mode indication 55 is exposed in the mode indicating window 57 when the indicating plate 50 is urged backward by the spring 53, and the electric mode indication 56 is exposed therein when the indicating plate 50 is urged forward. The indicating plate 50 is moved forward by a front end portion of the zooming operation ring 26, when the zooming operation ring 26 is moved forward and presses against the indicating plate 50.

Figure 5C:
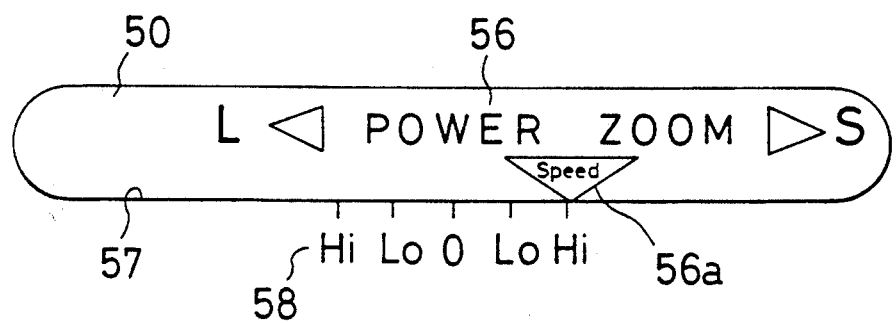
FIG. 5C is an enlarged view of mode indicating window and the indication plate visible therethrough according to the first embodiment of the present invention.

As shown in FIG. 5C, a peripheral portion of the mode indicating window 57 is provided with a speed scale 58 which includes "0", "Lo" and "Hi" and indicates an amount of rotation from the neutral position of the indicating plate 50 (the zooming operation ring 26). The electric mode indication 56 is provided with a speed indicator 56a facing the speed scale 58.

Figure 6:
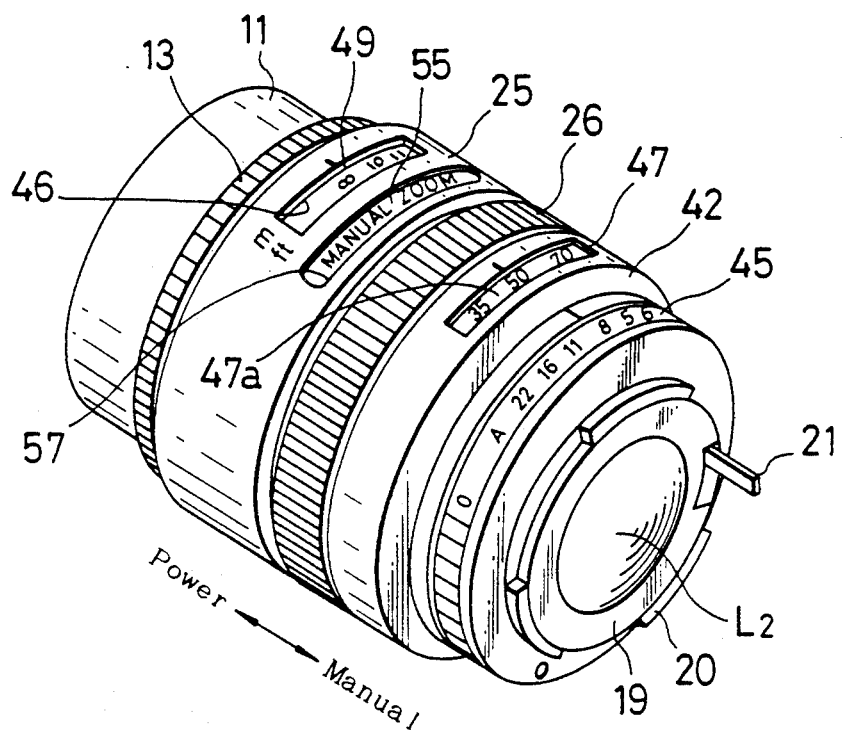
FIG. 6 is a perspective view showing the electrically driven zoom lens barrel of the first embodiment.

Note that, as shown in FIG. 6, a stop scale ring 45 is located at a rear portion of the cover ring 42 and a distance scale window 46 is formed in the stationary cylinder 25, whereby a distance scale 49, provided on an outer surface of the focus ring 13 can be observed through the distance scale window 46. A focal length window 47 is formed in the cover ring 42, in which a focal length scale 47a, provided on an outer surface of the manual zooming ring 28, can be observed. As shown in FIGS. 1 and 2, a rotation restriction projection 48 is fixed to the stationary cylinder 25, and engaged with a groove 13c formed on an outer surface of the focus ring 13, and extending for a predetermined angle, whereby the rotation range of the focus ring 13 is restricted.

An operation of this embodiment is described below.

When the zooming operation ring 26 is moved rearward, and accordingly, the click ball 29 is engaged with the V-groove A, the electrically driven zoom lens barrel is set to the manual mode. In this state, as shown in FIG. 5A, one of the constant interval notches 26b is engaged with the projection 28b, so that the zooming operation ring 26 and manual zooming ring 28 are connected to each other and rotate as a single body. Accordingly, if the zooming operation ring 26 is rotated, the cam ring 15 is rotated through an engagement of the straight groove 28a and the manual lever 23, and accordingly, a zooming operation is carried out.

In this condition, as shown in FIGS. 5A and 6, the manual mode indication 55 of the indicating plate 50 is displayed in the mode indicating window 57, and thus it can be clearly seen that the manual mode is set.

Conversely, if the zooming operation ring 26 is moved forward, and accordingly, the click ball 29 is engaged with the V-groove B, the electrically driven zoom lens barrel is set to the electric mode. In this state, as shown in FIG. 5B, and end portion of the zooming operation ring 26 presses against the indicating plate 50 and compresses the spring 53, and accordingly, the electric mode indicating 56 of the indicating plate 50 is displayed in the mode indicating window 57, and therefore, it can be clearly seen that the electric mode is set.

In this condition, the projection 26a of the zooming operation ring 26 and one of the constant interval notches 27a are engaged with each other, and accordingly, the zooming operation ring 26 and the switch ring 27 are connected to each other and rotate in the same direction as a single body. If the switch ring 27 is rotated in one direction from the neutral position N by the zooming operation ring 26, the brush 37 and the code plate 38 sense the direction of rotation, and accordingly, the rotation direction control circuit 40a of the motor control circuit 40 drives the motor 22 to rotate in the forward or reverse direction. Namely, the zooming direction to the tele-photo state or wide-angle state are controlled by a direction of rotation of the zooming operation ring 26. The brush 37 and the code plate 38 also sense an amount of rotation of the switch ring 27, i.e., the zooming operation ring 26, 26. Thus the larger the amount of the rotation, the higher the speed of the motor 22 is made by the speed control circuit 40b of the motor control circuit 40. When the motor 22 is driven, the cam ring 15 is rotated, whereby the front lens group L1, the rear lens group L2 and the stop moving ring 16 are moved along the optical axis in a predetermined relationship. Thus a zooming operation is carried out.

The zooming direction is indicated by the marks "L", "S", and the arrow provided on the electric mode indication 56 displayed at the mode indication window 57. The zooming speed is indicated in such a manner that either the "Lo" or "Hi" symbols of the speed scale 58 formed on a periphery of the mode indicating window 57 is indicated by the speed indicator 56a of the electric mode indicator 56.

The zooming speed may be changed continuously or in steps. This speed change can be freely carried out by setting the code of the code plate 38 or by signals.

When the zooming operation ring 26 is rotated in the forward or reverse direction from the neutral position N, only one of the pair of return springs 33 is deformed as shown in FIG. 3B. Then, when the operation force is released, due to a spring force of the leg 33b of the deformed return spring 33, the switch ring 27 is returned to the neutral position N through the return pin 31 and the motor 22 is stopped. During this return of the switch ring 27, the neutral pin 36 is engaged with the leg 33b, to prevent an excessive deformation of the leg 33b and a rotation of the switch ring 27 beyond the neutral position N. The above-described return operation is carried out in the same way whether the zooming operation ring 26 is rotated in the forward or the reverse direction (i.e., in the tele-photo or wide-angle direction).

The difference between the electric mode and the manual mode is that the cam ring 15 is rotated through the motor 22 or by the manual lever 23: either way, a zooming operation is carried out.

Note that, in the electric mode, the manual lever 23 is rotated together with the cam ring 15, and thus the manual zooming ring 28 is rotated. Nevertheless, since the manual zooming ring 28 and the zooming operation ring 26 are not engaged with each other, no problem occurs.

Figure 7:
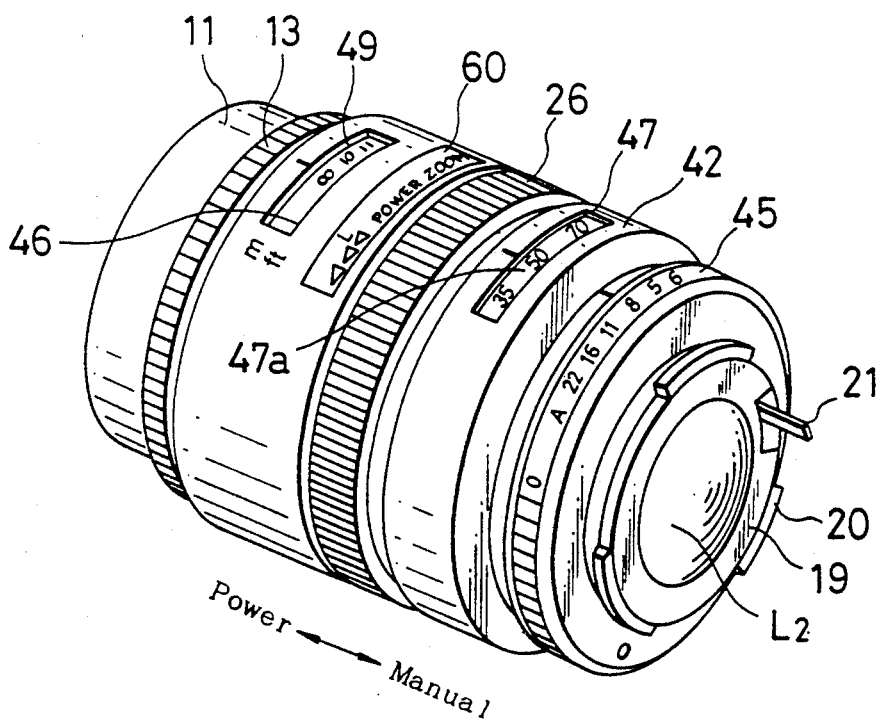
FIG. 7 is a perspective view showing an electrically driven zoom lens barrel of a second embodiment.

FIGS. 7 through 9 show a second embodiment of the present invention. In this embodiment, a liquid crystal display is used for displaying an indication that the zooming operation is being carried out in the electric mode or the manual mode. Namely, a liquid crystal display 60 is provided at a position corresponding to the position at which the mode indicating window 57 is provided in the first embodiment. Members such as the indicating plate 50, the spring 53 and the pin 54 are omitted, and instead, as shown in FIG. 1, a code plate 61 and a brush 62 for sensing a position of the zooming operation ring 26 along the optical axis, i.e., for sensing whether a zooming operation is being carried out in the manual mode or the electric mode, are provided between the stationary ring 25 and the zooming operation ring 26. While FIG. 1 shows both the code plate 61 and brush 62 of the second embodiment, as well as the indication plate 50 of the first embodiment, in practice, only one of these mechanisms will be incorporated in a particular lens.

A signal sensed by the code plate 61 and the brush 62, and denoting the manual mode or the electric mode, is inputted to an information process circuit 65 as shown in FIG. 8. Data showing the zooming direction and zooming speed are outputted from the code plate 38 and the brush 37 and inputted to the information process circuit 65. This information is then displayed at the liquid crystal display 60 after passing through an indicating circuit 66.

FIG. 9 shows examples of the displays made by the liquid crystal display 60, wherein D1 shows a display in which all of the indication patterns are shown, as an explanation: D2 shows a display in which the zooming operation is switched to the manual mode; D3 shows a display in which the zooming operation is switched to the electric mode; D4 shows a display in which the zooming operation is carried out in the electric mode, to a long focal length L at a low speed; D5 shows a display in which the zooming operation is carried out in the electric mode, to a short focal length S at a low speed; D6 shows a display in which the zooming operation is carried out in the electric mode, to the long focal length L at an intermediate speed; D7 shows a display in which the zooming operation is carried out in the electric mode, to the long focal length L at a high speed; D8 shows a display in which the zooming operation is carried out in the electric mode, to the short focal length S at an intermediate speed; and D9 shows a display in which the zooming operation is carried out in the electric mode, to the short focal length S at a high speed.

In each of the above embodiments, the manual zooming ring 28 is provided for transmitting a rotation of the zooming operation ring 26 to the manual level 23. However if the zoom lens barrel is constructed in such a manner that, when the zooming operation ring 26 is moved rearward, the zooming operation ring 26 is directly engaged with the manual lever 23 and they are thus connected and rotate in the same direction as a single body, the manual zooming ring 28 can be omitted.

Further, it is evident that the present invention is not related to a construction of the zooming mechanism. Namely, the present invention can be applied to any device in which the motor 22 is rotated in a forward or reverse direction in accordance with a forward or reverse rotation of the switch ring 27, so that a zooming operation is carried out, and the manual lever 23 is rotated in a forward or reverse direction so that the zooming operation is carried out mechanically (i.e., manually).

Although the embodiments of the present invention have been described herein with reference to the accompanying drawings, obviously many modifications and changes may be made by those skilled in this art without departing from the scope of the invention.

The present disclosure relates to subject matter contained in Japanese patent application No.2-33017 (filed on Feb. 14, 1990) which is expressly incorporated herein by reference in its entirety.

We claim:

1. An electrically driven zoom lens barrel including lens groups, by which a zooming operation is carried out, said electrically driven zoom lens barrel comprising:
    means for moving said lens groups to thereby carry out a zooming operation;
    means for electrically operating said moving means;
    means for manually operating said moving means;
    means for controlling a selective actuation of one of said electrically operating means and said manually operating means; and
    an indicating member indicating whether the zooming operation is carried out by said electrically operating means or said manually operating means, said indicating member being provided separately from said control means.

2. An electrically driven zoom lens barrel according to claim 1, wherein said indicating member indicates a manual operating mode when the zooming operation is carried out by said manually operating means, and indicates the electric mode and a zooming direction when the zooming operation is carried out by said electrically operating means.

3. An electrically driven zoom lens barrel according to claim 2, wherein said indicating member further indicates the zooming speed when the zooming operation is carried out by said electrically operating means.

4. An electrically driven zoom lens barrel according to claim 1, wherein said electrically operating means is provided with a motor for operating said lens groups moving means, an electric circuit for rotating said motor, and a switch member rotated by said control means to thereby control said electric circuit.

5. An electrically driven zoom lens barrel according to claim 1, wherein said manually operating means is provided with a manual zooming member rotated by said control means to thereby operate said lens groups moving means.

6. An electrically driven zoom lens barrel according to claim 1, wherein said electrically operating means is provided with a motor for operating said lens groups moving means, an electric circuit for rotating said motor, and a switch member rotated by said control means to thereby control said electric circuit, said manually operating means is provided with a manual zooming member rotated by said control means to thereby operate said lens groups moving means, and said control means is provided with a zooming operation member selectively engageable with one of said switch member and said manual zooming member.

7. An electrically driven zoom lens barrel according to claim 6, wherein one of said zooming operation member and said switch member is provided with notches equidistantly spaced apart along an end portion thereof, and the other of said zooming operation member and said switch member is provided with a projection engageable with said notches.

8. An electrically driven zoom lens barrel according to claim 6, wherein one of said zooming operation member and said manually operating member is provided with notches equidistantly spaced apart along an end portion of the member, and the other of said zooming operation member and said manual zooming member is provided with a projection engageable with said notches.

9. An electrically driven zoom lens barrel according to claim 6, wherein said indicating member is pressed against and is moved by said zooming operation member, when said zooming operation member is moved toward said indicating member.

10. An electrically driven zoom lens barrel according to claim 1, wherein said indicating member is provided close to said control means, and is provided with indication symbols denoting the manual mode and the electric mode and including a zooming direction.

11. An electrically driven zoom lens barrel according to claim 10, wherein said control means is provided with a guide pin, and said indicating member is provided with a guide groove in which said guide pin is engaged, in such a manner that said indicating member is movable along said guide groove.

12. An electrically driven zoom lens barrel according to claim 10, wherein said control means is provided with a spring urging said indicating member in a direction corresponding to one of the electric mode and the manual mode.

13. An electrically driven zoom lens barrel according to claim 10, further comprising means for displaying one of said indication sysbols.

14. An electrically driven zoom lens barrel which can be moved for a zooming operation in an electric mode and a manual mode, said electrically driven zoom lens barrel comprising:

a switching member for switching between said electric mode and said manual mode;

a zooming operation member for carrying out a zooming operation in one of said electric mode and said manual mode; and an indicating member provided separately from said switching member and said zooming operation member;

said indicating member displaying said manual mode when said switching member is switched to said manual mode, and displaying said electric mode and a zooming direction when said switching member is switched to said electric mode.

15. An electrically driven zoom lens barrel according to claim 14, wherein said indicating member indicates the zooming speed when the zooming operation is carried out in said electric mode.

16. An electrically driven zoom lens barrel according to claim 14, wherein said switching member and said zooming operation member are the same member.

17. An electrically driven zoom lens barrel which can be moved for a zooming operation in an electric mode and a manual mode;

characterized in that an indicating member is provided separately from mechanisms for carrying out the zooming operation and a switching between said electric mode and said manual mode, and displays said manual mode when the zooming operation is carried out in said manual mode, and displays said electric mode and a zooming direction when the zooming operation is carried out in said electric mode.

18. An indicator member for use with a zoom lens barrel which can be selectively moved for zooming in an electric mode and in a manual mode, said indicator member comprising selectively visible indicating portions for displaying an indication of the electric mode of movement together with a zoom direction, when zooming is carried out in the electric mode, and displaying an indication of the manual mode when zooming is carried out in the manual mode.

* * * * *

UNITED STATES PATENT AND TRADEMARK OFFICE
CERTIFICATE OF CORRECTION

PATENT NO. : 5,164,860
DATED : November 17, 1992
INVENTOR(S) : H. SUZUKI et al.

It is certified that error appears in the above-indentified patent and that said Letters Patent is hereby corrected as shown below:

At column 9, line 43 (claim 13, line 3), "sysbols" should be changed to ---symbols---.

Signed and Sealed this

Ninth Day of May, 1995

BRUCE LEHMAN

*Attest:*

*Attesting Officer*    *Commissioner of Patents and Trademarks*